(12) United States Patent
Parks

(10) Patent No.: US 6,246,185 B1
(45) Date of Patent: Jun. 12, 2001

(54) HIGH FREQUENCY BALLAST FOR HIGH INTENSITY DISCHARGE LAMPS

(75) Inventor: David B. Parks, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/469,069

(22) Filed: Dec. 21, 1999

Related U.S. Application Data

(60) Provisional application No. 60/114,316, filed on Dec. 31, 1998.

(51) Int. Cl.[7] ................................................ G05F 1/00
(52) U.S. Cl. .......................... 315/291; 315/307; 315/244; 315/DIG. 7; 348/771; 348/811
(58) Field of Search .................................. 315/291, 307, 315/209 R, 244, 282, DIG. 7; 345/87, 94, 98, 214; 348/607, 771, 739, 811; 359/245, 248, 251, 259, 237, 264

(56) References Cited

U.S. PATENT DOCUMENTS

| 5,192,946 | * | 3/1993 | Thompson et al. | 348/764 |
| 5,504,504 | * | 4/1996 | Markandey et al. | 345/214 |
| 5,510,824 | * | 4/1996 | Nelson | 347/239 |
| 5,774,196 | * | 6/1998 | Marshall | 348/743 |
| 6,072,283 | * | 6/2000 | Hedrei et al. | 315/307 |

* cited by examiner

Primary Examiner—Haissa Philogene
(74) Attorney, Agent, or Firm—Charles A. Brill; Wade James Brady, III; Frederick J. Telecky, Jr.

(57) ABSTRACT

A high frequency arc lamp power supply (518) and display system (500). The power supply (518) drives an arc lamp (504) at a frequency high enough to several times higher than the display system's LSB frequency. By pulsing the lamp many times during each LSB period, the variations in light output during the pulses are all integrated in each bit period and do not degrade the quality of the image display. This eliminates the need for the controller (514) to synchronize the arc lamp power supply (518) with the spatial light modulator (502) when using pulse width modulation.

15 Claims, 2 Drawing Sheets

HIGH FREQUENCY BALLAST FOR HIGH INTENSITY DISCHARGE LAMPS

This application claims priority under 35 USC § 119(e)(1) of provisional application Ser. No. 60/114,316 filed Dec. 31, 1998.

FIELD OF THE INVENTION

This invention relates to the field of high intensity arc discharge lamps, more particularly to power supplies for high frequency high intensity arc discharge lamps.

BACKGROUND OF THE INVENTION

Arc lamps have long been used to provide a high intensity beam of light for use in a projection display system. Many of the projection display systems in use today, whether a traditional theater movie projectors or a micromirror based conference room projector, use an arc lamp as a light source. Arc lamps provide a high intensity light beam with a color spectrum suitable for image projection in a relatively small package.

Some arc lamps use an alternating current supply to drive the lamp. Changes in the polarity of the drive current create fluctuations in the intensity of the light generated by the light source. These fluctuations are not a concern for most types of displays. The fluctuations, however, degrade the projected image when they occur only during a portion of an image created by binary pulse width modulation (PWM). In order to use an arc lamp, binary PWM display systems must be synchronized to the fluctuations. Synchronizing the display system to the arc lamp increases the cost of the system and often reduces the brightness of the display system.

SUMMARY OF THE INVENTION

Objects and advantages will be obvious, and will in part appear hereinafter and will be accomplished by the present invention which provides a method and system for a high frequency arc lamp power supply and display system using the high frequency arc lamp and supply. According to one embodiment of the disclosed invention, a display system is disclosed. The display system comprising: a light source, a modulator array, and a controller providing image data signals to the modulator array. The light source provides a periodically varying beam of light, wherein the period of the light source output is equal to or less than one tenth the LSB period of the display.

According to another embodiment of the invention, a power supply is disclosed. The power supply produces a high frequency signal to drive an arc lamp. Yet another embodiment of the disclosed invention provides a method of displaying an image. The method comprising: pulsing a light source to provide a periodic beam of light along a light path, and pulse width modulating said beam of light with a spatial light modulator. The period of the periodically varying beam of light is less than 0.1 times a least significant pulse width period so that several periods of fluctuations are integrated in each LSB period.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new method and system for driving an arc lamp for use in a visual display system has been developed. The new method and system reduces the impact of intensity variations due to changes in the polarity of the AC drive current to the point where it is no longer necessary to synchronize the arc lamp drive current with the operation of the display modulator.

In addition to eliminating the circuitry required to synchronize the lamp with the display system, the lamp power supply disclosed herein reduces the number of components in the lamp supply itself. Furthermore, while reducing the circuitry required to be present in the display system and in the lamp supply, the disclosed improved supply improves the efficiency of the ballast from approximately 75% for existing low frequency supplies to greater than 90%. By improving the efficiency of the supply, less energy is consumed by the supply. Therefore the supply disclosed herein generates less heat, allowing the use of a smaller heat sink, and less cooling air.

Figure 1:
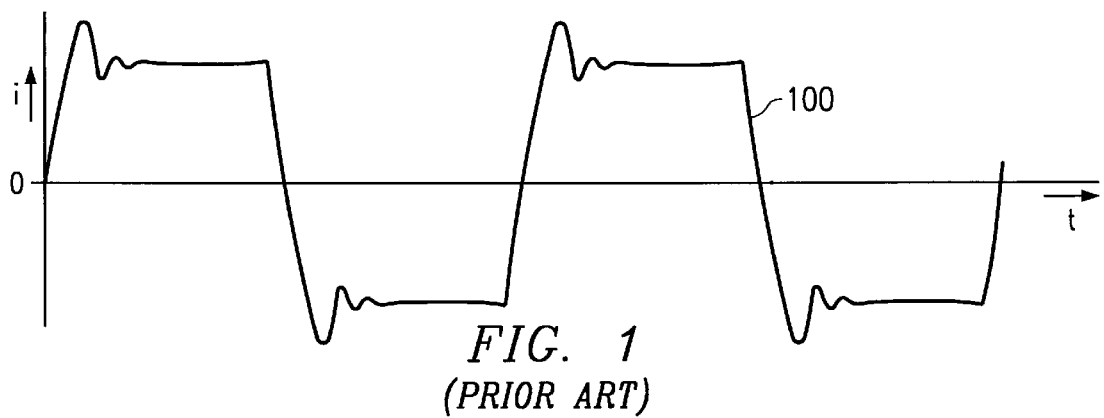
FIG. 1 is a plot of the arc current for a typical low frequency arc lamp of the prior art.
Figure 2:
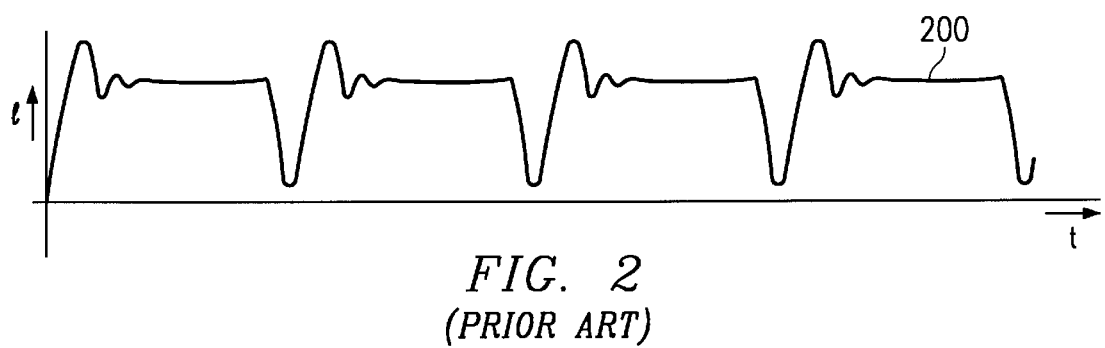
FIG. 2 is a plot of the intensity of light output by an arc lamp having the input current shown in FIG. 1.

FIG. 1 is a plot of the arc current for a typical low frequency arc lamp power supply. As seen in FIG. 1, the arc current 100 has a finite rise and fall time and a substantial ripple after the polarity changes. FIG. 2 is a plot of the intensity of light generated by an arc lamp having the arc current of FIG. 1. As seen in FIG. 2, the light output 200 by the arc lamp is far from constant over each light pulse.

Figure 3:
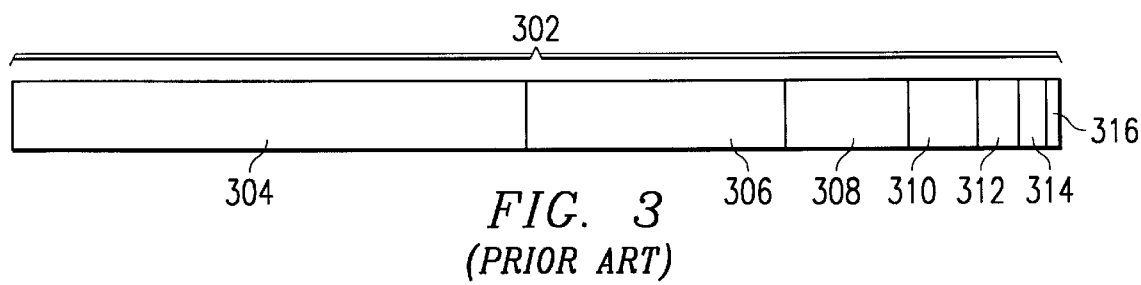
FIG. 3 is a timeline showing the division of a single color frame period into bit periods in a basic pulse width modulation display system of the prior art.

FIG. 3 is a timeline of a simple pulse width modulation frame period. The frame period 302 shown in FIG. 3 is divided into seven individual bit periods. During each bit period, a single data bit from a seven-bit intensity word is used to control the light modulator. The length of each bit period is proportional to the magnitude represented by the bit, or bit weight.

For example, the most significant bit (MSB) in the seven-bit binary-weighted intensity word is displayed during period 304. Bit period 304 has a duration of 64/127 of the total frame period 302. The next most significant bit has a bit period 306 equal to half of the MSB bit period 304, or 32/127 of the total frame period. Likewise, bit period 308 has a duration of 16/127 of the total frame period, bit period 310 has a duration of 8/127 of the total frame period, bit period 312 has a duration of 4/127 of the total frame period, bit period 314 has a duration of 2/127 of the total frame period, and bit period 316 has a duration of 1/127 of the total frame period. In general, the bit period for a bit is equal to $2^{n-1}/(2^m-1)$ where n is the weight of the bit and m is the total number of bits in the intensity word.

The human eye, or other photoreceptor, integrates the light intensity over a period greater than the frame period and gives the perception of an intermediate intensity value. If the light source is assumed to have a constant output, the lumens directed to the screen during the bit period will be proportional to the binary weight of the image data and the perceived intermediate intensity values will accurately portray the intended image. If the light is not constant, the integrated intensity will not represent the intended image and the image quality will be reduced.

To avoid the effects of the intensity drop-offs and ripples shown in FIG. 2, binary pulse width modulation systems typically synchronize the commutations to the frame rate, and blank out the period in which the light has the greatest perturbations. As mentioned above, these blanking periods reduce the useable light from the arc lamp and reduce the brightness of the projected image. Additionally, the circuitry required to synchronize the display engine to the arc lamp increases the cost of the system.

The disclosed invention teaches a high frequency arc lamp power supply. By dramatically increasing the frequency of the supply current waveform, from around 100 Hz to between 500 kHz and 1 MHz, the variations in the lamp output are made to occur several times every LSB time. Because the lamp waveform repeats 10 to 20 times each LSB period, the intensity of the light produced by the lamp is fairly constant over any LSB period or multiple thereof.

Figure 4:
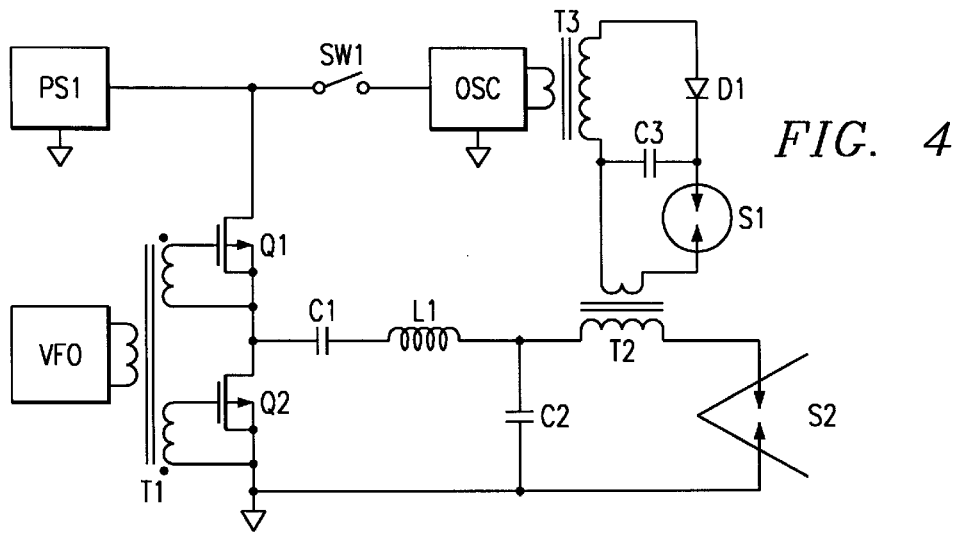
FIG. 4 is a schematic of a lamp power supply according to one embodiment of the present invention.

FIG. 4 is a schematic of one embodiment of the disclosed invention. In FIG. 4, PS1 is a power source, preferably a power source capable of producing 1 amp of current at 300 volts. VFO is an oscillator, preferably a 500 kHz to 1 MHz manually adjustable variable frequency oscillator. Q1 and Q2 are power transistors, preferably IRF450 MOSFETs. C1 is a capacitor, preferably a 0.033 $\mu f$, 500 V capacitor. L1 is an inductor, preferably a 10 $\mu h$, 10A inductor with a T160-2 core. C2 is a capacitor, preferably a 0.015 $\mu h$, 500 V capacitor. T2 is a transformer, preferably a 1:10 transformer with a secondary coil that forms a 2.2 $\mu h$ inductor with an air gap. S2 is the arc lamp, for example a 270W Osram HID lamp.

VFO rapidly switches Q1 and Q2 on and off to provide excitation pulses to the circuit. C1, C2, L1 and the secondary of T2 form a resonant impedance matching circuit to provide high frequency current pulses to the arc lamp S2.

The circuit of FIG. 4 also provides an igniter circuit for starting the lamp. SW1 is a normally open switch for enabling the igniter circuit. T3 is a transformer, preferably a 20:1 pulse transformer. D1 is a diode, preferably a 5000V diode. C3 is a capacitor. S1 is a 3000V spark gap. When SW1 is closed, the igniter circuit provides current pulses to initiate arcing in the lamp.

Figure 5:
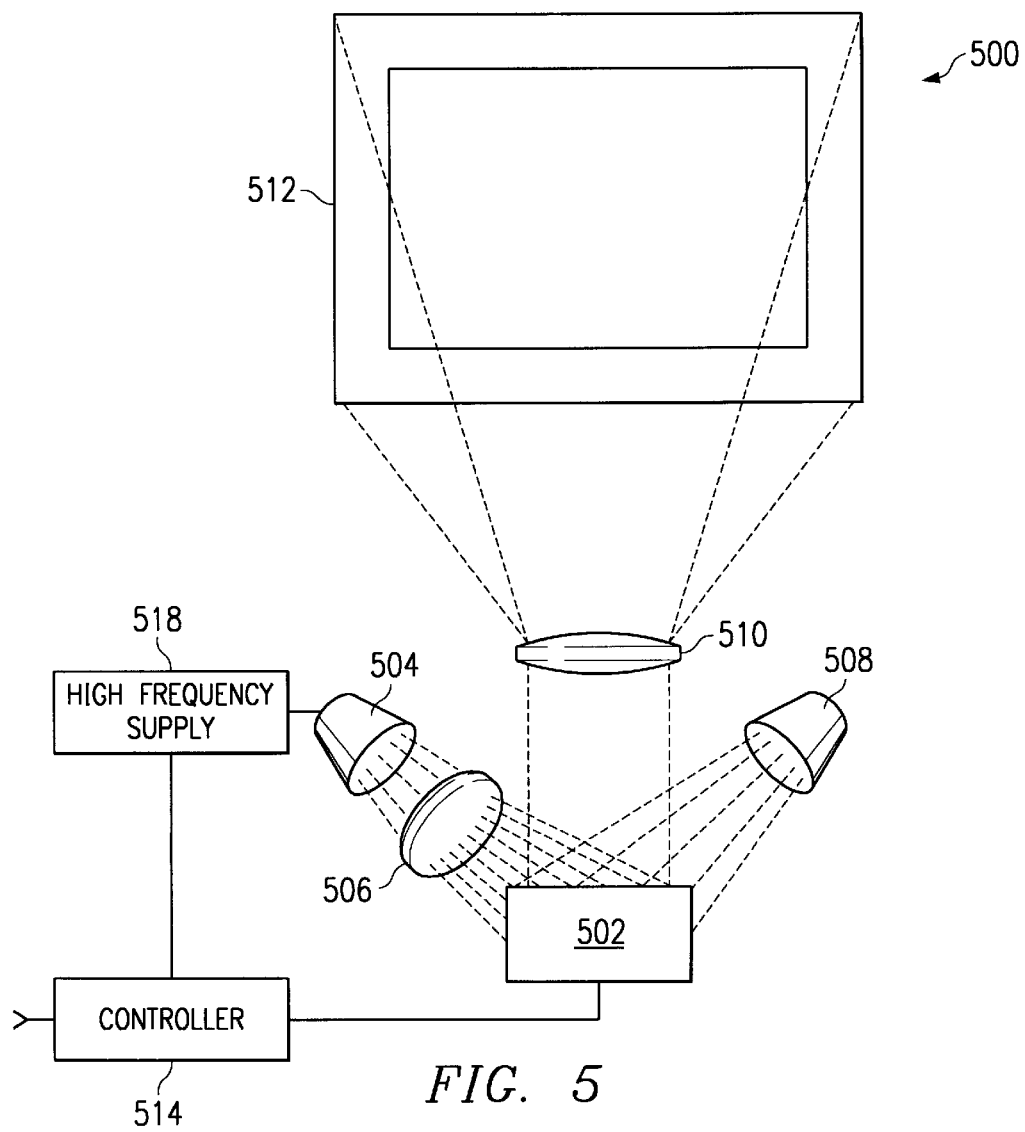
FIG. 5 is a schematic view of one embodiment of an image projection system using the high frequency light source of FIG. 4 to drive an arc lamp.

FIG. 5 is a schematic view of one embodiment of an image projection system 500 implementing the high frequency light source 504 and supply 518 taught herein. In FIG. 5, light from light source 504 is focused on a micromirror device 502 by lens 506. Although shown as a single lens, lens 506 is typically a group of lenses, mirrors, and prisms which together focus and direct light from the light source 504 onto the surface of the micromirror device 502. Image data and control signals from controller 514 cause some mirrors to rotate to an on position and others to rotate to an off position. Mirrors on the micromirror device that are rotated to an off position reflect light to a light trap 508 while mirrors rotated to an on position reflect light to projection lens 510, shown as a single lens for purposes of illustration. Projection lens 510 focuses the light modulated by the micromirror device 502 onto an image plane or screen 512.

Thus, although there has been disclosed to this point a particular embodiment for a high frequency arc lamp and power supply and method, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A display system comprising:
   a light source for providing beam of light along a light path, said beam of light periodically varying due to changes in polarity of an alternating drive current;
   a modulator array in said light path;
   a controller electrically connected to said modulator array, said controller operable to receive image data and to control said modulator array, said image data comprising multiple bits of image data for each element in said modulator array, said controller providing said bits of image data to said modulator array elements such that the total quantity of light directed by each modulator element to an image plane is proportional to the weight of said image data bit; and
   wherein a period of said periodically varying beam of light is less than 0.1 times a least significant bit period of said data signal.

2. The display system of claim 1, said light source further comprising:
   an arc lamp having two inputs, a first said input connected to a ground; and
   a power source, said power source comprising:
      a current source;
      two transistors in series between an output of said current source and said ground;
      an oscillator inductively coupled to a gate of said transistors, said oscillator for alternately enabling said two transistors;
      a capacitor connected to a node between said two transistors;
      an inductor in series with said capacitor, said inductor having two leads, a first of said two leads connected to said capacitor;
      a second capacitor connected between a second of said two leads of said inductor and said ground;
      a second inductor having two leads, a first lead of said second inductor connected to a junction of said first inductor and said second capacitor, a second lead of said second inductor connected to a second input of said arc lamp.

3. The display system of claim 2, further comprising an igniter circuit inductively coupled to said second inductor.

4. The display system of claim 2, wherein said oscillator operates at a frequency from 500 kHz to 1 MHz.

5. A power supply for an arc lamp, said power supply comprising:
   a current source;
   two transistors in series between an output of said current source and said ground;
   an oscillator inductively coupled to a gate of said transistors, said oscillator for alternately enabling said two transistors;
   a capacitor connected to a node between said two transistors;
   an inductor in series with said capacitor, said inductor having two leads, a first of said two leads connected to said capacitor;

a second capacitor connected between a second of said two leads of said inductor and said ground;

a second inductor having two leads, a first lead of said second inductor connected to a junction of said first inductor and said second capacitor, a second lead of said second inductor for connection to an input of said arc lamp.

6. The power supply of claim 5, further comprising an igniter circuit inductively coupled to said second inductor.

7. The power supply of claim 5, wherein said oscillator operates at a frequency from 500 kHz to 1 MHz.

8. A method of displaying an image, said method comprising:

pulsing a light source to provide a periodic beam of light along a light path; and pulse width modulating said beam of light with a spatial light modulator, wherein a period of said periodically varying beam of light is less than 0.1 times a least significant pulse width period.

9. A display system comprising:

a light source for providing a periodically varying beam of light along a light path; said light source comprising an arc lamp having two inputs and a power source comprising:
 a current source;
 two transistors in series between an output of said current source and a ground;
 an oscillator inductively coupled to a gate of said transistors, said oscillator for alternately enabling said two transistors;
 a capacitor connected to a node between said two transistors;
 an inductor in series with said capacitor, said inductor having two leads, a first of said two leads connected to said capacitor;
 a second capacitor connected between a second of said two leads of said inductor and said ground; and
 a second inductor having two leads, a first lead of said second inductor connected to a junction of said first inductor and said second capacitor, a second lead of said second inductor connected to a first input of said arc lamp, a second input of said arc lamp connected to said ground;

a modulator array in said light path; and a controller electrically connected to said modulator array, said controller operable to receive image data and to control said modulator array, said image data comprising multiple bits of image data for each element in said modulator array, said controller providing said bits of image data to said modulator array elements such that the total quantity of light directed by each modulator element to an image plane is proportional to the weight of said image data bit.

10. The display system of claim 9, further comprising an igniter circuit inductively coupled to said second inductor.

11. The display system of claim 9, wherein said oscillator operates at a frequency from 500 kHz to 1 MHz.

12. A display system comprising:

a light source for providing a beam of light along a light path, said beam of light periodically varying at a frequency from 500 kHz to 1 MHz due to changes in polarity of an alternating drive current;

a modulator array in said light path; and a controller electrically connected to said modulator array, said controller operable to receive image data and to control said modulator array, said image data comprising multiple bits of image data for each element in said modulator array, said controller providing said bits of image data to said modulator array elements such that the total quantity of light directed by each modulator element to an image plane is proportional to the weight of said image data bit.

13. The display system of claim 12, said light source further comprising:

an arc lamp having two inputs, a first said input connected to a ground; and a power source, said power source comprising:
 a current source;
 two transistors in series between an output of said current source and said ground;
 an oscillator inductively coupled to a gate of said transistors, said oscillator for alternately enabling said two transistors;
 a capacitor connected to a node between said two transistors;
 an inductor in series with said capacitor, said inductor having two leads, a first of said two leads connected to said capacitor;
 a second capacitor connected between a second of said two leads of said inductor and said ground;
 a second inductor having two leads, a first lead of said second inductor connected to a junction of said first inductor and said second capacitor, a second lead of said second inductor connected to a second input of said arc lamp.

14. The display system of claim 13, further comprising an igniter circuit inductively coupled to said second inductor.

15. A method of displaying an image, said method comprising:

pulsing a light source to provide a periodic beam of light along a light path, said periodic beam of light having a period of between 1 $\mu S$ and 2 $\mu S$ due to changes in polarity of an alternating drive current; and pulse width modulating said beam of light with a spatial light modulator, wherein a period of said periodically varying beam of light is less than 0.1 times a least significant pulse width period.

* * * * *